No. 730,034. PATENTED JUNE 2, 1903.
R. MACONOCHIE.
LIBRARY OR LIKE INDICATOR.
APPLICATION FILED FEB. 12, 1903.
NO MODEL. 2 SHEETS—SHEET 1.
Fig. 1. Fig. 2.
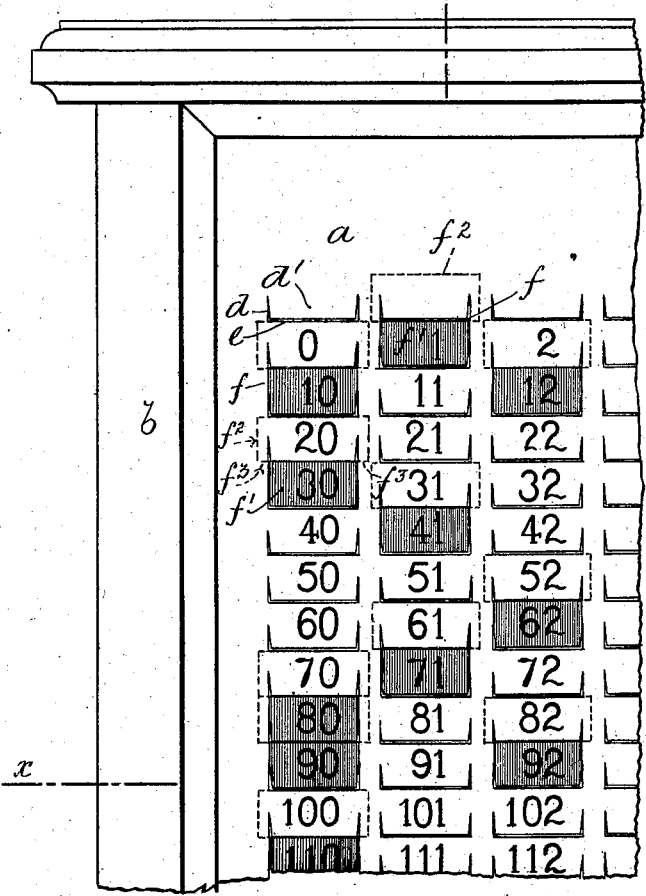
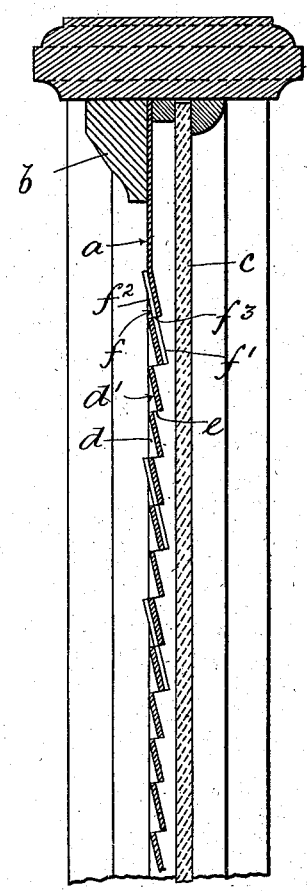
Fig. 4. Fig. 5.
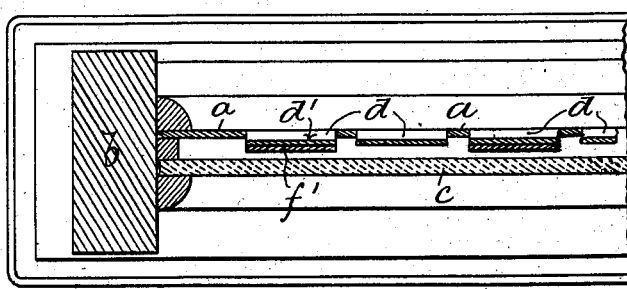
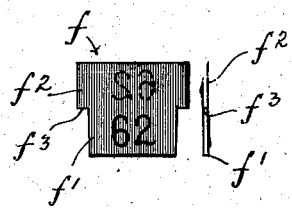
WITNESSES
Inventor
Richardson Maconochie
By
James L. Norris.
Atty.

No. 730,034. PATENTED JUNE 2, 1903.
R. MACONOCHIE.
LIBRARY OR LIKE INDICATOR.
APPLICATION FILED FEB. 12, 1903.
NO MODEL. 2 SHEETS—SHEET 2.
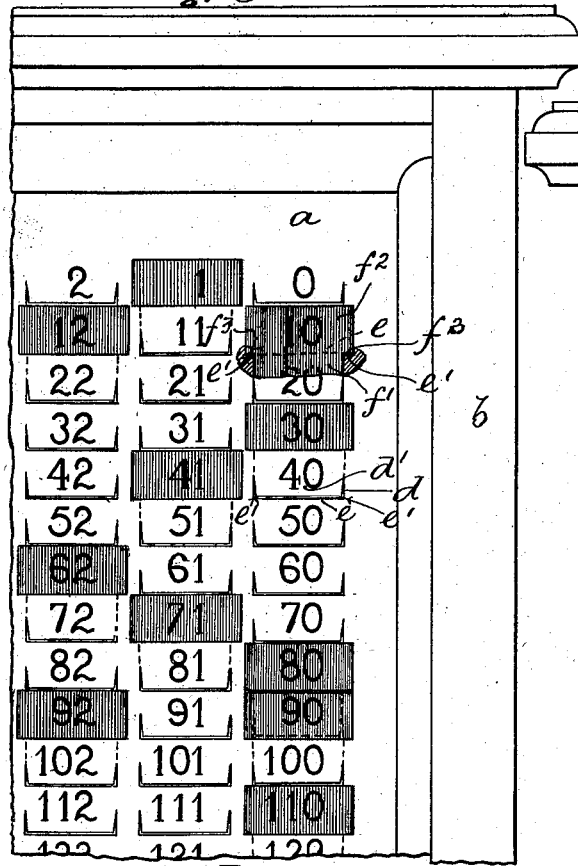
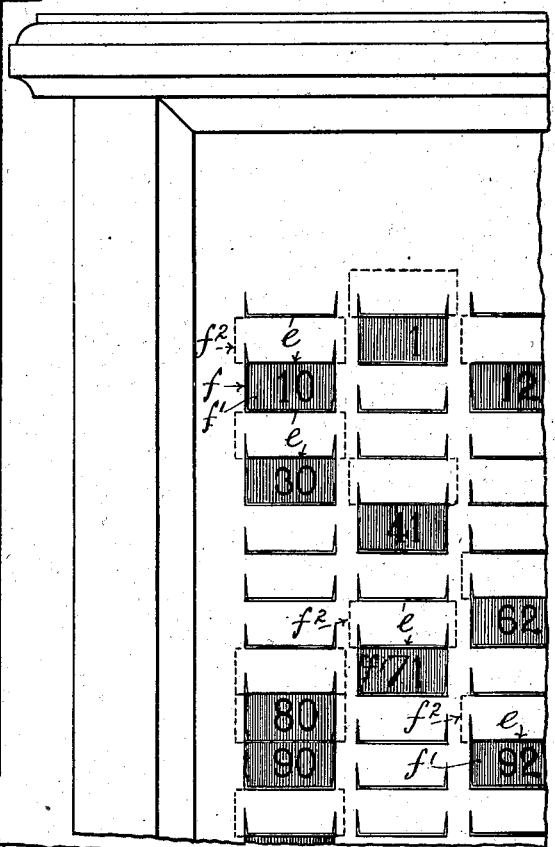
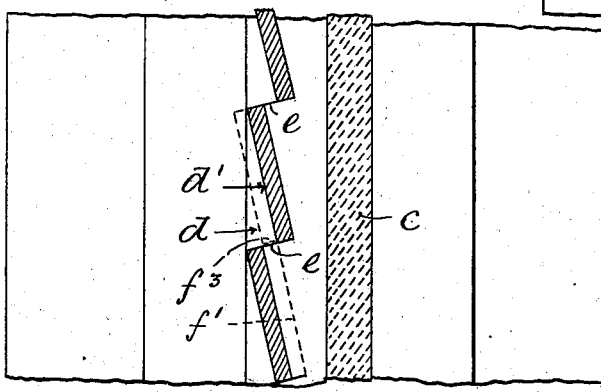
WITNESSES 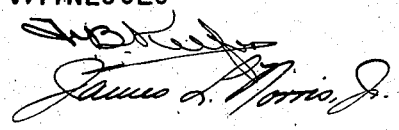
Inventor
Richardson Maconochie
By
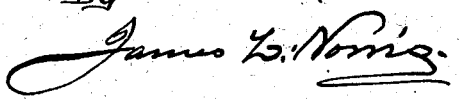
Atty.

No. 730,034. Patented June 2, 1903.

UNITED STATES PATENT OFFICE.

RICHARDSON MACONOCHIE, OF BIRMINGHAM, ENGLAND.

LIBRARY OR LIKE INDICATOR.

SPECIFICATION forming part of Letters Patent No. 730,034, dated June 2, 1903.

Application filed February 12, 1903. Serial No. 143,124. (No model.)

*To all whom it may concern:*

Be it known that I, RICHARDSON MACONOCHIE, manufacturer, a subject of the King of Great Britain, residing in Albert street, in the city of Birmingham, England, have invented certain new and useful Improvements in Library or Like Indicators, of which the following is a specification.

This invention has relation to indicators such as are used in public libraries for indicating the issue and return of books, and in breweries, stores, and the like for indicating the issue and return of casks, boxes, bottles, and like articles; also the whereabout of such articles or the person to whom the same have been sent or issued.

The object of the invention is to provide a simple and inexpensive form of indicator capable of being made from a flat sheet or surface of fiber, metal, cardboard, or other material without the aid of wooden or metallic framework and other accessory parts or fittings such as have to be used in connection with indicators of the ordinary type.

Figure 1 of the accompanying drawings represents an elevation of the front or public side of a library-indicator constructed in accordance with one form of my invention. Fig. 2 is a vertical section of the said indicator, taken upon the dotted line $x$, Fig. 1. Fig. 3 is an elevation of the back or librarian's side of the said indicator. Fig. 4 represents a horizontal section of the said indicator upon the dotted line $x'$, Fig. 1. Fig. 5 shows in front elevation and edge view one of the loose numbered tickets which are used in conjunction with the indicator represented in Figs. 1 to 4. Fig. 6 is a vertical section of a portion of the said indicator, upon an enlarged scale. Fig. 7 is a front elevation of a portion of the indicator, showing certain of the cards in position.

The same letters of reference indicate corresponding parts in the said Figs. 1 to 6.

This form of the improved indicator consists of a sheet, tablet, or panel $a$, of suitable dimensions, made from metal, fiber, cardboard, or other material, supported within a framework, such as $b$, with the front or public side being protected by a glazing $c$, while the librarian's side is left open to admit of the indicator-tickets being placed in or removed from their receptacles in the said panel. A series of numbers are arranged in any desired order in rows or otherwise on the front of the said panel, and a corresponding series of similarly-disposed numbers are arranged on the back, or instead of numbers names, letters, or other signs may be used and the said numbers, names, letters, or the like are representative of the books whose issue and return are to be indicated. Each of the parts of the sheet or panel on which a number or the like is indicated is pressed back to form a recess $d$, with a sloping back $d'$, and is also longitudinally slotted or perforated at $e$ with the said slots or perforations running underneath the numbers or the like on the librarian's side of the indicator and above the corresponding number on the public side of the panel. Take, as an instance, the number "2" in Figs. 1 and 3. It will be observed that in Fig. 1 (the public side) this number comes below the slot $e$ and on the front of the second recess of the third vertical row, whereas on the librarian's side this same number comes above the said slot and on the back of the first recess of the said row. The receptacle thus formed in the back of the panel by the slots $e$ and recesses $d$ are adapted to receive loose or removable tickets, cards, slips, tabs, pegs, clips, or other means for keeping records of issues and returns or for showing the whereabout and dates of issue or dates when returns are due of the books or articles represented by the said slips or the like. In the arrangement shown in the said Figs. 1 to 6 the indicator is furnished with loose cards or tickets $f$, of fiber or other material, bearing on both sides numbers, names, or letters corresponding to the numbers, names, or letters of the receptacles within which they are respectively designed to be placed. The cards or tickets which it is preferred to employ in conjunction with the indicator shown in the said figures have taper or straight-sided shanks $f'$, enlarged heads $f^2$, and overhanging shoulders $f^3$ at the junction of the heads with the shanks, which are of such width as to admit of them being passed through the horizontal slots of the indicator-panel, while the shoulders by overhanging the ends $e'$ of the said slots, as shown by the broken-away portion of Fig. 3, prevent the tickets from passing completely through the slots, and thus the said tickets are supported with the heads lying within and covering up the numbers on the backs of the recesses on the librarian's side of the indicator-panel and with their shanks projecting through to the front of the said panel and covering up the corresponding numbers on the public side thereof. The cards or tickets are marked on both sides with numbers or figures corresponding to the numbering of the particular receptacles in which they are destined to be placed, and the number on the one side is marked on the head part, and on the other side upon the shank, (see Fig. 5,) so that when any particular ticket is placed in its proper receptacle the numbered head will mask or cover up the number on the back of the recess on the librarian's side, while the similarly - numbered shank will cover up the corresponding number on the public side.

In Figs. 1 and 3 several of the indicator-cards are shown placed in their receptacles with their numberings displayed at both the front and the back of the indicator, and in Fig. 1 the shanks thereof as seen by the public are shown by the shaded portions (see "10," "30," "80," "90," "110," &c.) and the heads are indicated by dotted lines, while in Fig. 3 the heads, as seen on the librarian's side, are indicated by shaded portions and the stems by dotted lines.

In the enlarged sectional view Fig. 6 the dotted lines indicate the positions in which the head and shank of a card are supported by the shoulders $f^3$ with respect to the back of one panel-recess and the front of the recess immediately below it.

The simplified indicator above described may be used in several ways. Either the tickets may be inserted in their receptacles on a book being issued or they may be placed in their receptacles when the books they represent are in the library and removed on the book being issued, so that the absence of any particular numbered ticket from the panel would indicate to the public that the corresponding volume was "out;" or, according to another system, when the books or the articles which the tickets represent are issued or sent out the said tickets may be removed and exchanged for other slips or means for indicating the person or place to which the said articles have been sent or the dates of issue or the dates when they should be returned. The indicator-tickets when removed from the receptacles in the indicator panel or tablet may either be placed temporarily in a tray, drawer, or the like and arranged under the name of the person or place to whom issued or under a record of the date of issue or of the date when due for return, or else the said tickets may be sent away and returned with the articles themselves. When the article is returned, then the indicator-slip is replaced within its proper receptacle in the indicator-panel after the removal from the said receptacle of the record card-slip or the like (which may be a borrower's ticket in the case of public or subscription libraries) representing the person to whom the said article was issued, which is either arranged in the tray or receptacle or else returned to the person in question.

Instead of the panel being numbered on both the librarian and the public sides, as in the arrangement above described, it may be numbered on the librarian's side only, the public side being left blank, as shown in Fig. 7. The form and arrangement of the panel in other respects is the same as in the construction shown in Figs. 1 to 6, and the same kind of loose tickets or cards $f$ may be used with numbers on the shank parts $f'$, which are displayed upon the public side of the indicator on the said shanks being inserted through their corresponding slots $e$ in the panel, as shown by the shaded portions of the drawings, while the dotted lines represent the positions of the heads $f^2$ which lie in front of and screen the numbers marked upon the recesses on the back or librarian's side of the indicator.

The loose indicator and record tickets, tabs, slips, cards, tickets, or the like may be variously colored, the different colorings being used to indicate different dates of issue, dates for return, and the like; or panels with recesses numbered on the one side only may be used as single-sided indicators, in which both the public and the library staff have access to the one side of the indicator only. The slots and recesses then form receptacles for supporting the tickets in such a manner that when in position they screen or cover up the numbers of the particular recess into which they are inserted.

Instead of forming the indicator tickets, cards, or slips with shoulders overhanging and resting upon the ends of the slots and supporting the said tickets or the like in such a manner as to present the one half or part of the same on one side of the indicator and the other half or part on the other indicator the said indicator-cards or the like may be formed with taper or sloping side edges adapted to permit of the said cards being passed half way through the slots for the purpose of displaying the number or the like marked on the lower part at the front of the indicator-panel.

Having fully described my invention, what I desire to claim and secure by Letters Patent is—

1. An indicator consisting of a sheet of material formed with a series of inclined recesses arranged above horizontal slots or openings to provide receptacles in combination with removable indicating-cards, adapted to be mounted in said receptacles so that the said cards will be displayed partly on the front of and partly on the back of the said sheet of material, substantially as and for the purposes as herein described and set forth.

2. An indicator consisting of a sheet of material provided with recesses to form a plurality of receptacles, and removable indicating-cards, adapted to be mounted in said receptacles and having end shoulders whereby the said cards, on being inserted into the said receptacles are supported in such a manner that one half or part of each card is displayed on the one side of the sheet of material and the other half or part on the other side, substantially as and for the purpose herein described and set forth.

In testimony whereof I have hereunto set my hand in presence of two subscribing witnesses.

RICHARDSON MACONOCHIE.

Witnesses:
 HENRY SKERRETT,
 ARTHUR SADLER.